United States Patent [19]

Maracas et al.

[11] Patent Number: 5,727,977
[45] Date of Patent: Mar. 17, 1998

[54] PROCESS FOR MANUFACTURING A FIELD-EMISSION DEVICE

[75] Inventors: George N. Maracas, Phoenix; Lawrence N. Dworsky, Scottsdale; Herbert Goronkin; Kathleen Tobin, both of Tempe, all of Ariz.

[73] Assignee: Motorola, Inc., Schaumburg, Ill.

[21] Appl. No.: 608,023

[22] Filed: Mar. 4, 1996

[51] Int. Cl.$^6$ .................................................. H01J 9/02
[52] U.S. Cl. .................... 445/24; 216/13; 216/17
[58] Field of Search ........................ 445/24; 216/13, 216/17

[56] References Cited

U.S. PATENT DOCUMENTS

| | | | |
|---|---|---|---|
| 4,715,929 | 12/1987 | Ogawa | 156/643 |
| 4,945,028 | 7/1990 | Ogawa | 430/296 |
| 5,233,263 | 8/1993 | Cronin et al. | 313/309 |
| 5,512,131 | 4/1996 | Kumar et al. | 216/13 X |
| 5,514,501 | 5/1996 | Tarlov | 430/5 |
| 5,616,061 | 4/1997 | Potter | 445/24 |
| 5,618,760 | 4/1997 | Soh et al. | 438/703 |

*Primary Examiner*—Kenneth J. Ramsey
*Attorney, Agent, or Firm*—Eugene A. Parsons

[57] ABSTRACT

A process for manufacturing of a field emission device (100, 200) including the steps of i) providing a substrate (101, 201), ii) forming a conductive row (106, 206), ii) forming a dielectric layer (102, 202), iv) forming a resist layer (116, 216), v) forming a self-assembled monolayer (112, 212) of a self-assembled monolayer-forming molecular species on the resist layer (116, 216) so that the self-assembled monolayer (112, 212) defines an etch pattern for an emitter well (107, 207), vi) etching the resist layer (116, 216), vii) etching the dielectric layer ((102, 202), viii) forming conductive column (103, 203), and ix) forming the electron-emitter structure (105, 208) within the emitter well (107, 207).

19 Claims, 10 Drawing Sheets

PROCESS FOR MANUFACTURING A FIELD-EMISSION DEVICE

FIELD OF THE INVENTION

The present invention relates to a process for fabricating cold-cathode field-emission devices (FEDs) and more particularly to a process for manufacturing FEDs which utilizes self-assembled monolayers (SAMs) of self-assembled monolayer-forming molecular species.

BACKGROUND OF THE INVENTION

Cold-cathode field-emission devices (FEDs) and field emission displays are well known in the art. The prior art teaches that FEDs are formed by a number of preferred methods. One such method taught by the prior art includes the use of standard irradiative lithography including photolithography. Standard lithographic methods are used to pattern the metal rows and columns and to create the emitter wells in which the emitter material is disposed. The equipment utilized in standard irradiative lithography are costly, high-maintenance, and slow. They are limited to the patterning of relatively small areas due to limited field sizes. The fabrication of a field emission display typically requires the stitching together of a plurality of fields, which is a time-consuming process. A typical photolithographic stepper for semiconductor applications has a field having an area on the order of 1 in$^2$. Consequently, the throughput of these standard irradiative lithographic methods is low. These limitations can add significantly to the cost of structures which include FEDs.

A variety of FED structures are known in the art. Standard tip emitters are disclosed in U.S. Pat. No. 3,789,471 entitled "Field Emission Cathode Structures, Devices Utilizing Such Structures, and Methods of Producing Such Structures" by Spindt et al. Another type of emitter structure includes an edge emitter, an example of which is disclosed in U.S. Pat. No. 5,214,347 entitled "Layered Thin-Edge Field Emitter Device" by Henry F. Gray. Prior art processes for the fabrication of both types of emitter structures currently include the above costly lithographic techniques.

An example of an apparatus which incorporates field emission devices is a field emission display. Field emission displays which utilize arrays of field emission devices are well known in the art. U.S. Pat. No. 3,875,442, entitled "Display Panel," by Wasa et. al. discloses a field emission display. In order to form the emitter wells and pattern the conductive rows and columns that comprise the addressing scheme of the device, conventional photolithographic methods are employed. The dimensions of the array of field emission devices in a field emission display can be relatively large. For example, a display diagonal of 10.25 inches is a realistic value for a final product display. Available photolithographic equipment must fabricate a multitude of fields which are stitched together in order to provide the required dimensions of the display. Each patterning step, therefore, adds appreciably to the cost of the display. As a result, the process sequence is often limited to the economic restraint requiring the minimum number of mask steps.

Accordingly, there exists a need for an improved method of making a field emission display which is economical and utilizes low-cost, low-maintenance capital equipment, which quickly and easily produces large-area FED arrays, thereby increasing throughput, and which provides more flexibility in the number of patterning steps and materials selection (heretofore limited by cost restraints due to the lithography costs) to provide the optimum process in view of other considerations such as materials selection.

Micro-contact printing of self-assembled molecular monolayers (SAMs) is known in the art. The SAMs are comprised of molecules which have a functional group that binds to certain types of solids, and the remainder of the molecule interacts with neighboring molecules to form a dense structure which is impenetrable by certain chemical species. The prior art in micro-contact printing cannot print surfaces in a reliable or reproducible manner; in particular, the prior art methods cannot reliably or reproducibly print large-area surfaces having surface areas greater than about 1 in$^2$.

BRIEF DESCRIPTION OF THE DRAWINGS

Referring to the drawings.

DESCRIPTION OF THE PREFERRED EMBODIMENTS

Below are described several embodiments of a field emission device realized by performing various steps of a process for manufacturing a field emission device (FED) in accordance with the present invention. Some of the steps utilize a patterning method that employs self-assembled monolayers (SAMs) of molecular species. The steps of the process which require the formation of a SAM on a surface can be realized by employing the apparati and methods described in co-pending applications filed of even date herewith, Ser. No. 608,023 and Ser. No. 610,776 (now U.S. Pat. No. 5,669,303) assigned to the same assignee, and entitled "Apparatus and Method for Patterning a Surface" and "Apparatus and Method for Stamping a Surface", respectively, which applications are incorporated herein by reference. The former application describes a method for patterning a surface by utilizing SAMs and further discloses a flexible stamp which is used to reliably and reproducibly form a SAM pattern on a surface, which can be a large-area surface having a surface area greater than about 1 in$^2$. The patterning method includes the formation of micron and/or submicron features, such as those found in FEDs. The latter application describes an apparatus and method for reproducibly stamping a surface with a SAM. These methods and apparati permit an entire surface to be patterned in a single etch step, a substantial improvement over the prior art stitching limitations which reduce throughput and increase the variability of the patterning process.

Figure 1:
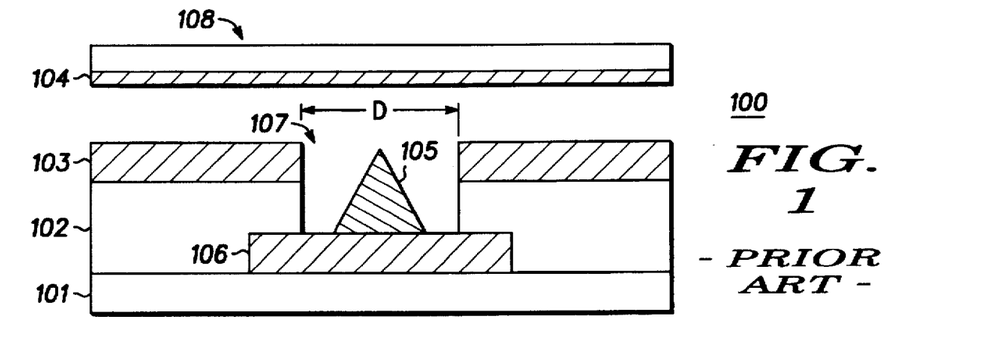
FIG. 1 is a sectional view of a prior art field emission device.

Referring now to FIG. 1 there is depicted a prior art field emission device 100 including a substrate 101, a dielectric layer 102, a conductive column 103, an electron-emitter 105, a conductive row 106, and an emitter well 107, which has a dimension, D, associated therewith. The value of D is on the order of 1 micrometer. When incorporated in a field emission display, FED 100 is directly opposed a face plate 108 which includes a cathodoluminescent layer 104 disposed thereon for receiving electrons emitted by electron-emitter 105. When electrons interact with cathodoluminescent layer 104, visible light is emitted thereby forming a visual display image. The operation of field emission device 100 is known in the art.

Referring now to FIGS. 2–17, there are depicted cross-sectional views of structures realized by performing various steps of a process for manufacturing field emission device 100 (FIG. 1) in accordance with the present invention. The formation of conductive row 106 is discussed with reference to FIGS. 2–5; the formation of emitter well 107 is described with reference to FIGS. 6–10; and the formation of conductive column 103 is discussed with reference to FIGS. 11–14; and an alternative method for forming conductive column 103 is described with reference to FIGS. 15–17.

Figure 2:
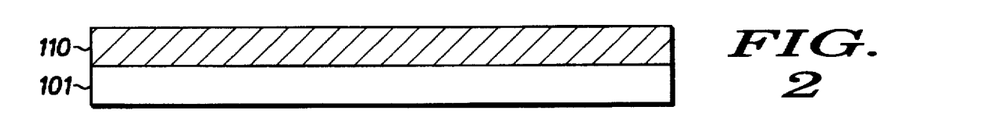
FIGS. 2–17 are cross-sectional views of structures realized by performing various steps of an embodiment of a process for manufacturing the field emission device of FIG. 1 in accordance with the present invention.
Figure 3:
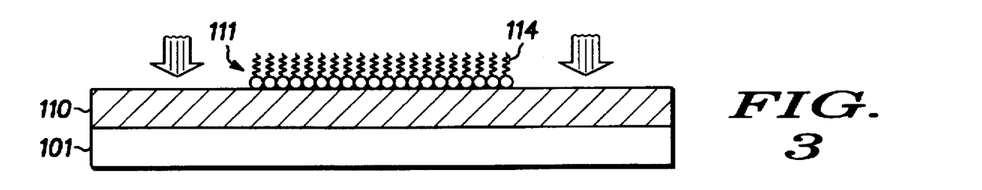
Figure 4:
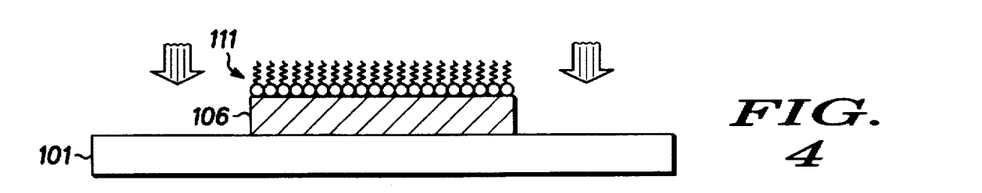
Figure 5:
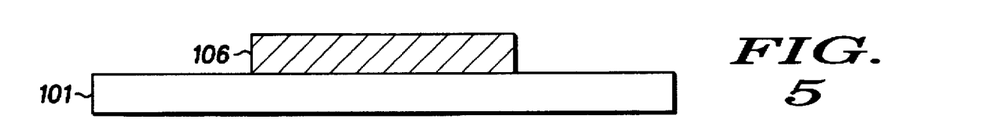

Referring now to FIGS. 2–5, there are depicted sectional views of structures realized by performing various steps of a method for forming conductive row 106 in accordance with the present invention. First, substrate 101 is provided and can be a layer of glass. Then, a conductive layer 110 is formed on the surface of substrate 101, as shown in FIG. 2. Next, conductive layer 110 is patterned to form conductive row 106. The patterning is achieved by first forming a self-assembled monolayer 111 (SAM) of a self-assembled monolayer-forming (SAM-forming) molecular species 114 on the outer surface of conductive layer 110. SAM 111 includes a conductive row pattern defining the configuration of conductive row 106. In this particular embodiment SAM 111 includes an elongated strip of SAM-forming molecular species 114. Those portions of conductive layer 110 which underlie the elongated strip are protected from attack during the subsequent etching step (described below) and will remain on the surface of substrate 101 when the etching is completed, thereby forming conductive row 106. The selection of SAM-forming molecular species 114 and of a material for conductive layer 110 are guided by criteria as described in the above referenced patent applications. The selection of the material for conductive layer 110 is also dependent on the chemistries involved in subsequent etching steps, as well as on considerations such as cost. An example of a cost-effective conductive material is aluminum. A suitable SAM-forming molecular species 114 for aluminum is one which has a first functional group that binds to aluminum and another functional group which tends form a dense layer above the aluminum layer. This dense layer must be impenetrable by the chosen aluminum etchant. An alkylthiol, such as hexadecanethiol, provides these features and is therefore a suitable SAM-forming molecular species 114 in this particular embodiment. A suitable etchant for aluminum, which is inert with respect to the alkylthiol SAM, is a ferricyanide-based etchant. An apparatus and method for forming SAM 111 are described in the above referenced patent applications. The arrows in FIG. 2 represent the action of the aluminum etchant, attacking those regions of conductive layer 110 not covered by SAM 111. Referring now to FIG. 4, there is depicted a cross-sectional view of the structure of FIG. 3 that has undergone the step of etching conductive layer 110, thereby forming conductive row 106. SAM 111 is removed by using an organic solvent. The resulting structure is depicted in FIG. 5. In an alternative embodiment of a process for manufacturing a field emission device in accordance with the present invention, conductive row 106 can be formed by providing a resist layer, as described in the above referenced applications, on the outer surface of conductive layer 110, and then forming SAM 111 on the outer surface of the resist layer, utilizing the appropriate SAM-forming molecular species 114 for the particular material of the resist layer. SAM 111 has the conductive row pattern. Thereafter, the resist layer is selectively etched with an appropriate etchant thereby transferring the conductive row pattern to the resist layer. Then, conductive layer 110 is selectively etched, and, thereafter, the resist layer is removed, thereby forming conductive row 106. This alternative embodiment is utilized, for example, if a suitable SAM-forming molecular species does not exist for the chosen material of conductive layer 110.

Figure 6:
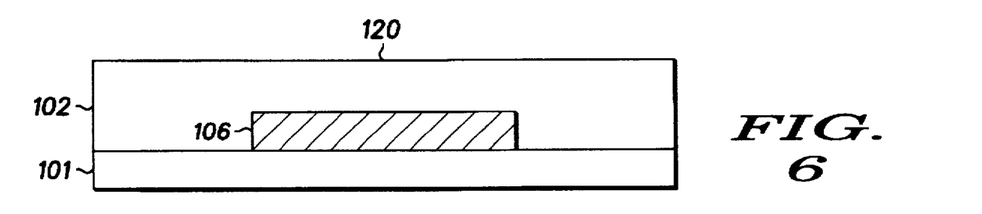
Figure 7:
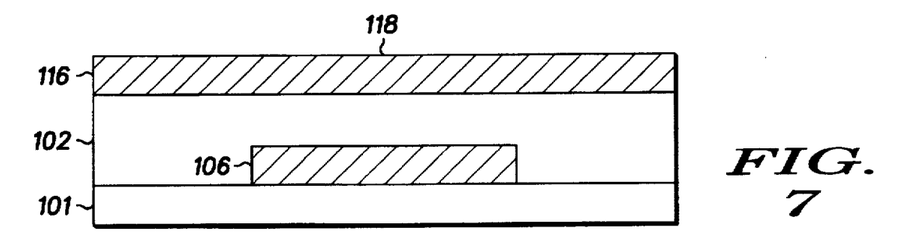
Figure 8:
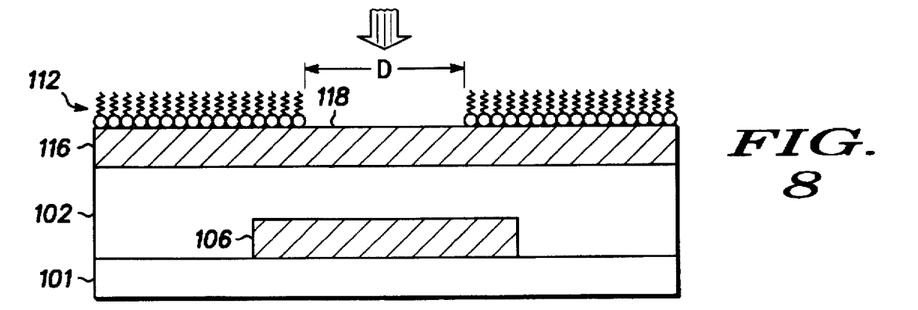
Figure 9:
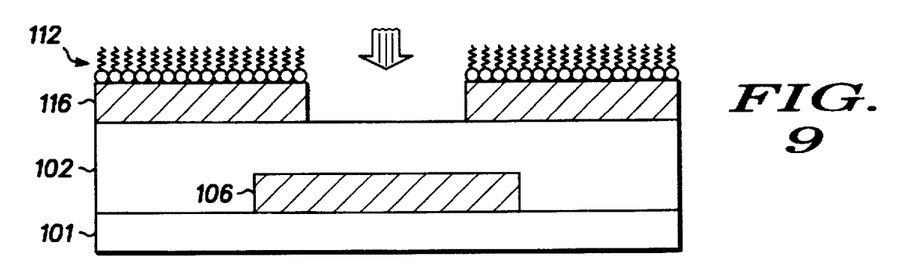
Figure 10:
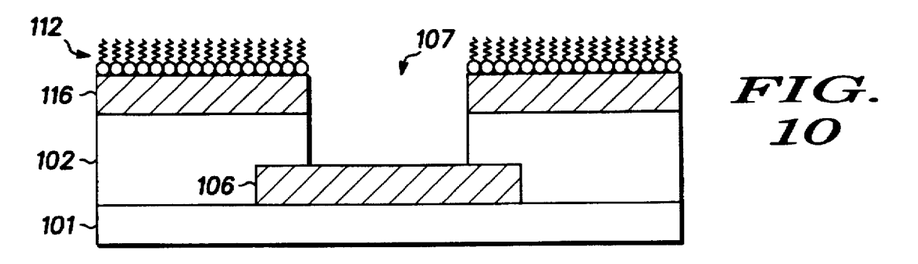

Referring now to FIGS. 6–10 there are depicted cross-sectional views of structures realized by performing various steps of a method for forming emitter well 107 in accordance with the present invention. Referring now to FIG. 6 there is depicted a cross-sectional view of the structure of FIG. 5 that has undergone the additional step of forming dielectric layer 102 on the outer surfaces of substrate 101 and conductive row 106. Dielectric layer 102 is made from a dielectric material, such as silicon dioxide, and can be formed by utilizing deposition methods common in the art, such as plasma-enhanced chemical vapor deposition. Dielectric layer 102 has an outer surface 120. Referring now to FIG. 7, there is depicted a cross-sectional view of the structure of FIG. 6 that has undergone the additional step of forming a resist layer 116, having an outer surface 118, on the outer surface of dielectric layer 102. As described in the above referenced applications, a suitable resist material for resist layer 116 can be chosen from metals such as titanium, gold, chromium, nickel, copper, and silver. Aluminum is not a suitable resist material for resist layer 116 because, as will be described in greater detail below, the subsequent step of forming the conductive column will include either the removal resist layer 116 or the patterning, or etching, of resist layer 116, both of which would involve chemistries that would also attack the aluminum of conductive row 106. The material of conductive row 106 is different, having different etch chemistry, from the material of resist layer 116. Referring now to FIG. 8, there is illustrated a cross-sectional view of the structure of FIG. 7 that has undergone the additional step of forming a SAM 112 on outer surface 118 of resist layer 116. SAM 112 defines an emitter well pattern, which, in this particular embodiment, includes an plurality of circular geometries, as will be described in more detail with reference to FIGS. 12–17. Those portions of outer surface 118 of resist layer 116 which are exposed, have the circular geometries of the emitter well pattern and have diameters equal to the dimension D, as described with reference to FIG. 1. The arrow in FIG. 8 represents the etching action of the etchant to perform the next step of etching resist layer 116 with an etchant chemically inert with respect to SAM 112 so that the emitter well pattern is transferred to resist layer 116. The resulting structure of this etching step is illustrated in FIG. 9. The arrow in FIG. 9 represents the etching action of the etchant to perform the next step of etching the dielectric layer with an etchant that is chemically inert with respect to conductive row 106 and resist layer 116, thereby forming emitter well 107. The resulting structure is depicted in FIG. 10. As shown in FIG. 10 dielectric layer 102 is etched so that conductive row 106 is exposed.

Figure 11:
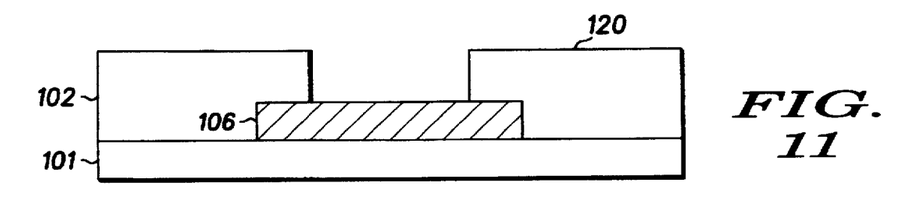
Figure 12:
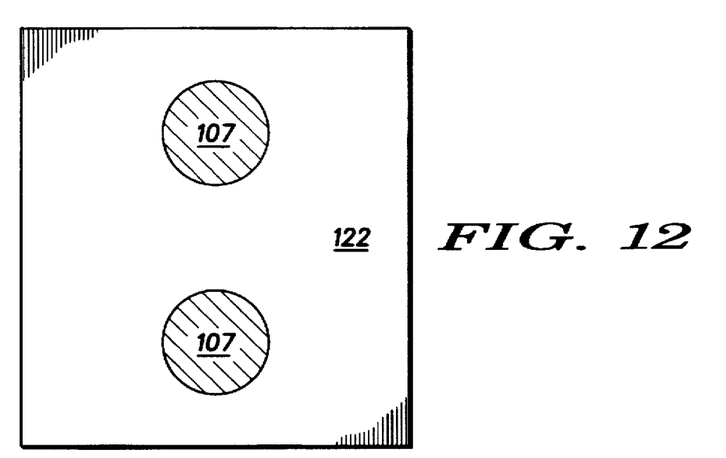
Figure 13:
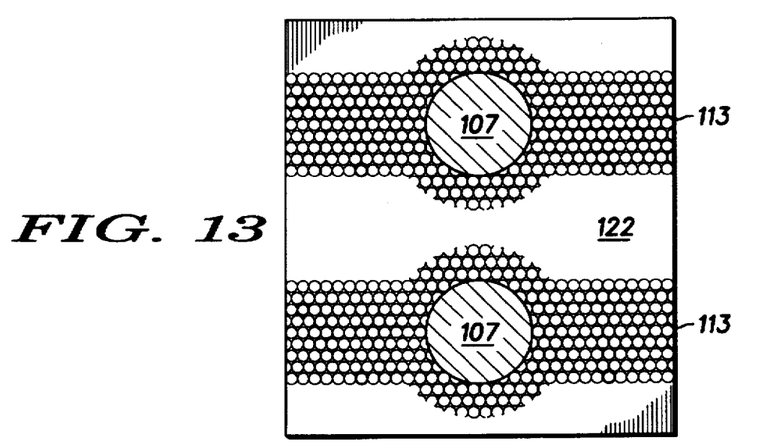
Figure 14:
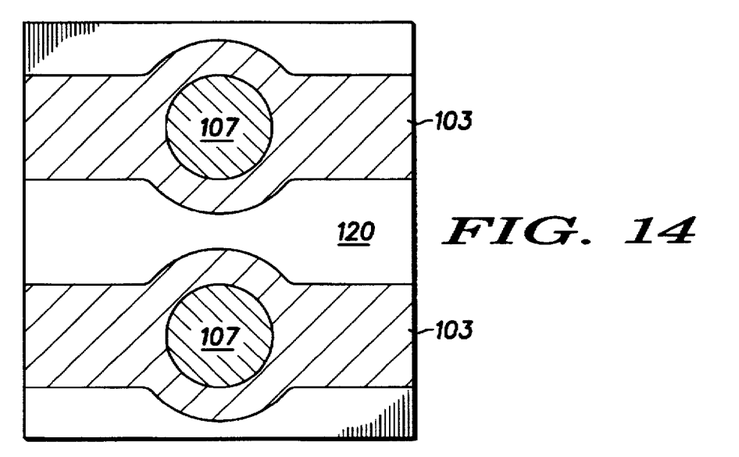

Referring now to FIGS. 11–14, there are depicted cross-sectional views of structures realized by performing various steps of one embodiment of a method for forming conductive column 103 in accordance with the present invention. Referring now to FIG. 11 there is depicted a cross-sectional view of the structure of FIG. 10 that has undergone the additional step of removing resist layer 116, thereby exposing outer surface 120 of dielectric layer 102. Referring now to FIG. 12, there is depicted a top plan view of the structure of FIG. 11 that has undergone the additional step of forming a conductive layer 122 on outer surface 120. Conductive layer 122 is formed from a material distinct from the material of conductive row 106 so that subsequent etching of conductive layer 122 does not attack conductive row 106. Referring now to FIG. 13, there is depicted a top plan view of the structure of FIG. 12 that has undergone the additional step of forming a self-assembled monolayer (SAM) 113 on the outer surface of conductive layer 122. SAM 113 includes a conductive column pattern. In this particular embodiment, the conductive column pattern includes elongated strips of the SAM-forming molecular species which intersect with, and encircle, the openings of emitter wells 107. Referring now to FIG. 14, there is depicted a top plan view of the structure of FIG. 13 that has undergone the additional steps of selectively etching conductive layer 122 and thereafter removing SAM 113. Conductive layer 122 is etched with an etchant that is chemically inert with respect to SAM 113 so that those portions of conductive layer 122 which underlie SAM 113 are not etched and thereby form conductive columns 103 when the etching step is complete. SAM 113 can be removed by using an organic solvent.

Figures 15, 16:
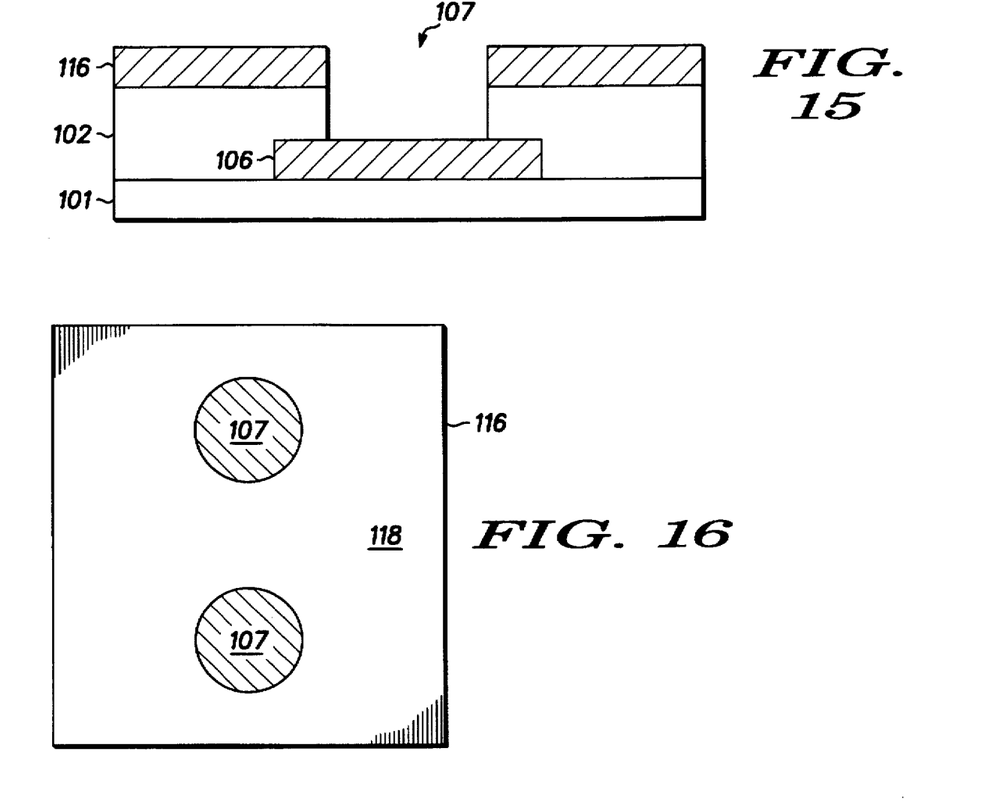
Figure 17:
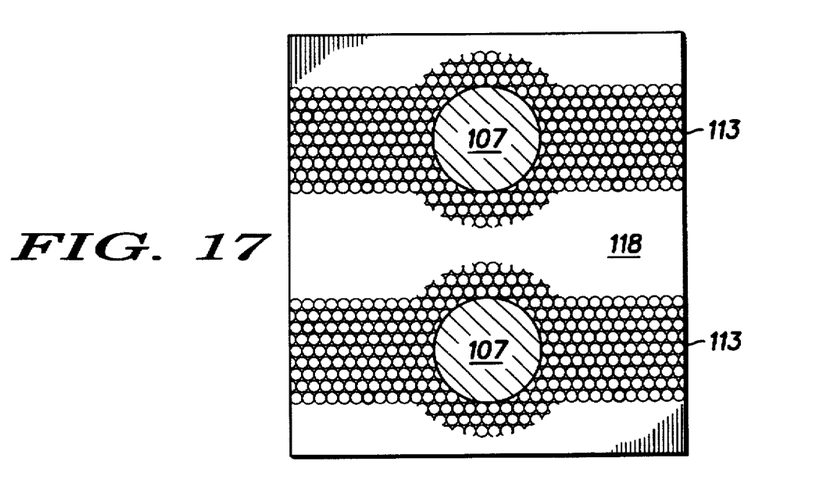

Referring now to FIGS. 15–17, there are depicted cross-sectional views of structures realized by performing various steps of another embodiment of a method for forming conductive column 103 in accordance with the present invention. In this particular embodiment, conductive column 103 is formed from resist layer 116 (FIG. 10). Referring now to FIG. 15, there is depicted a cross-sectional view of the structure of FIG. 10 which has undergone the additional step of removing SAM 112 from outer surface 118 of resist layer 116. Referring now to FIG. 16, there is depicted a top plan view of the structure of FIG. 15. Illustrated in FIG. 17 is a top plan view of the structure of FIG. 16 that has undergone the additional step of forming self-assembled monolayer 113 on outer surface 118. Self-assembled monolayer 113 defines a conductive column pattern as described in reference to FIG. 13. The final steps in the formation of conductive column 103 are the same as those described in reference to FIGS. 13 and 14, with the exception that resist layer 116 is etched during these final steps, as opposed to conductive layer 122.

The formation of emitter structure 105 (FIG. 1) is performed after emitter well 107 is formed. Methods of forming emitter structure 105, which, in the FED of FIG. 1, includes a sharp-tipped cone, are known in the art.

Figure 18:
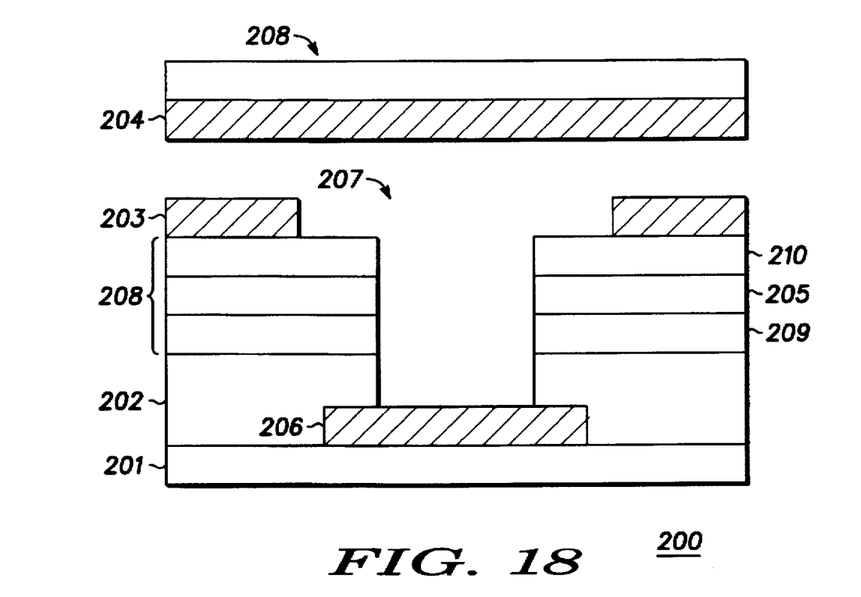
FIG. 18 is a cross-sectional view of a field emission device realized by performing various steps of another embodiment of a process for manufacturing a field emission device in accordance with the present invention.
Figure 19:
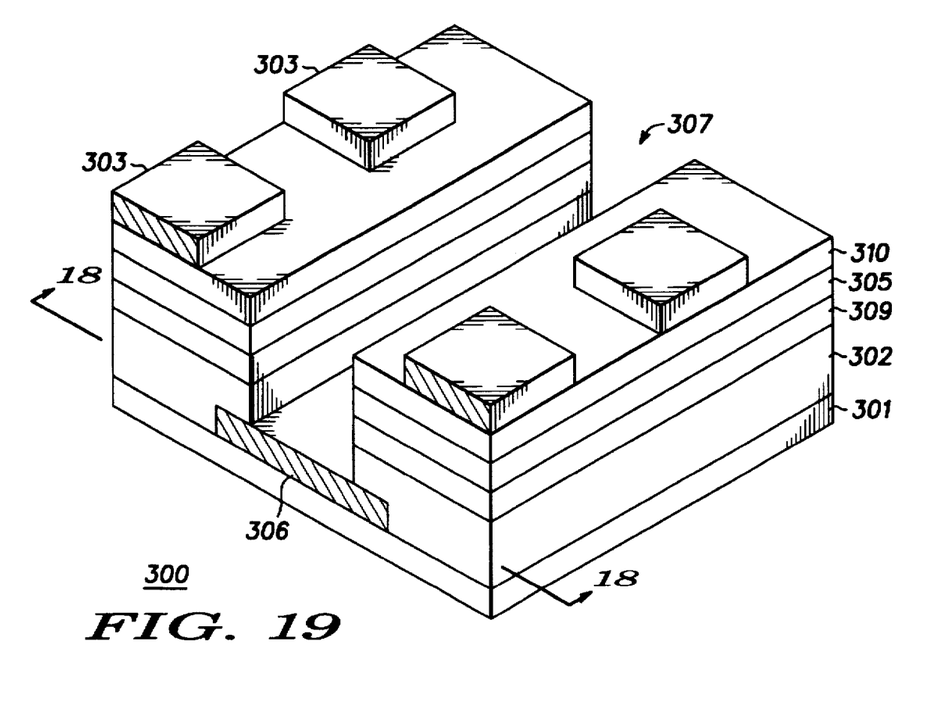
FIG. 19 is an isometric view of an embodiment of the field emission device of FIG. 18 realized by performing various steps of a process for manufacturing a field emission device in accordance with the present invention.
Figure 20:
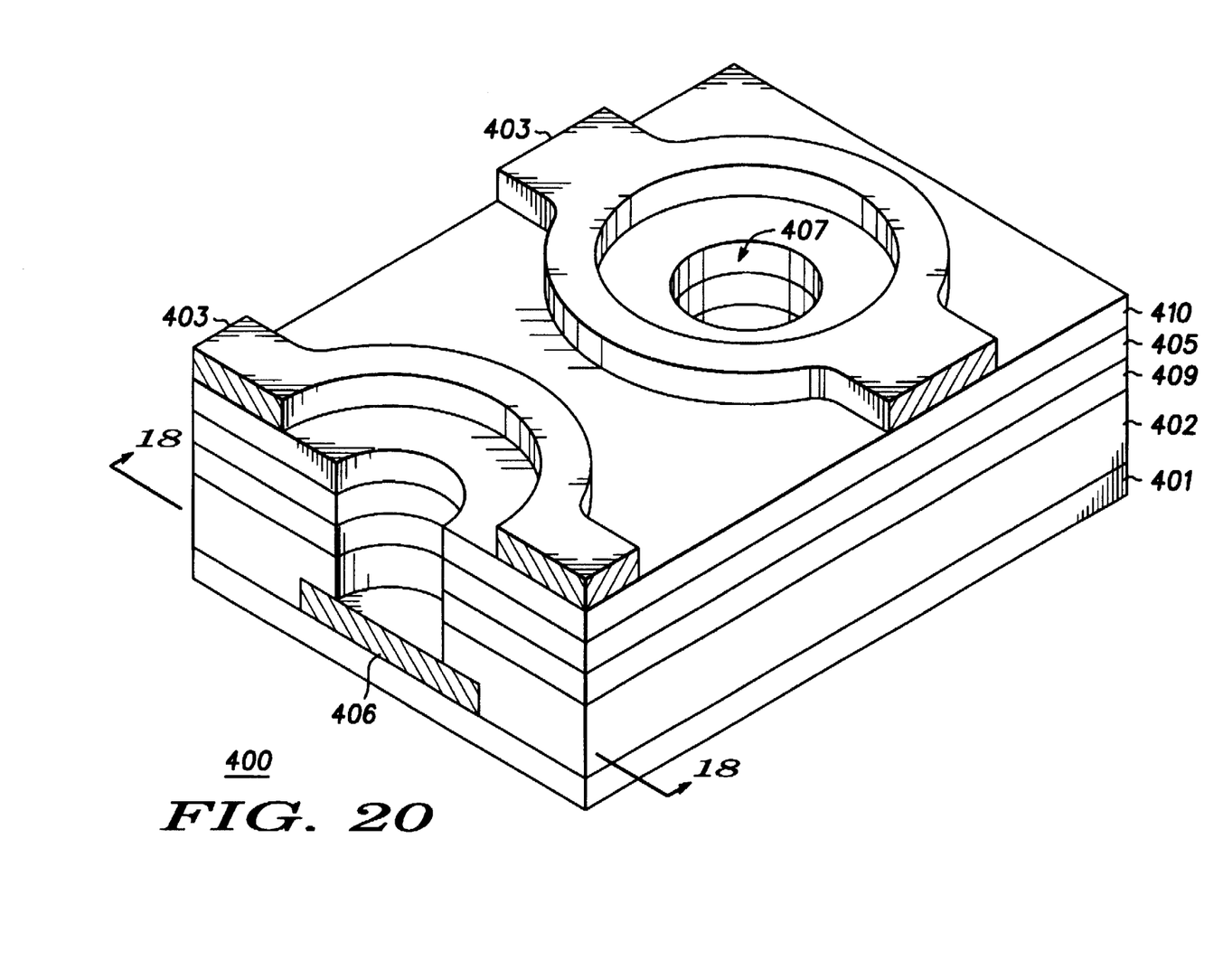
FIG. 20 is an isometric view of another embodiment of the field emission device of FIG. 18 realized by performing various steps of a process for manufacturing a field emission device in accordance with the present invention.

Referring now to FIGS. 18–20, there are depicted cross-sectional and isometric views of a field emission device 200, a field emission device 300, and a field emission device 400 realized by performing various steps of other embodiments of a process for manufacturing a field emission device in accordance with the present invention. Referring now to FIG. 19, there is illustrated an isometric view of FED 300, the cross-section (taken along the line 18—18) of which is depicted in FIG. 18. Depicted in FIG. 20 is an isometric view of FED 400, the cross-section (taken along the line 18—18 in FIG. 20) of which is also depicted in FIG. 18. It will be appreciated that other FEDs realized via other embodiments of the present invention are also represented by the structure in FIG. 18, and, thus, the reference numerals are distinct from the numerals related to the structures of FIGS. 19 and 20. The two embodiments of a process for manufacturing a FED which produce the structures of FIGS. 19 and 20 in accordance with the present invention, differ in the geometries of the patterns of the SAMs that are utilized in the patterning steps, and will be described in greater detail below. Other embodiments of the present invention are readily apparent and include other variations, not described in detail herein, in the geometries of the patterns of the SAMs.

Referring now to FIG. 18, FED 200 includes a substrate 201, a conductive row 206, a dielectric layer 202, a ballast resistor layer 209, an emissive layer 205, an emission control layer 210, and a conductive column 203. An emitter structure 208 is comprised of ballast resistor layer 209, emissive layer 205, and emission control layer 210. Ballast resistor layer 209 and emission control layer 210 include materials which have high work functions, while emissive layer 205 includes a material having a low work function. This feature, wherein a layer of low work function material is "sandwiched" by layers of high work function material, provides enhanced electron emission and greater control. When incorporated in a field emission display, FED 200 is positioned opposite a face plate 208 which has a cathodoluminescent layer 204 designed to receive electrons emitted by a plurality of electron-emitter structures 208. Referring now to FIGS. 19 and 20 the elements of FED 300 which are analogous to the elements of FED 200 are referenced by similar numerals, starting with a 3 instead of a 2; the analogous elements of FED 400 are referenced by similar numerals, starting with a 4 instead of a 2.

Referring now to FIGS. 21–30, there are depicted cross-sectional views of structures realized by performing various steps of two other embodiments of a process for manufacturing a field emission device to realize the structures of FIGS. 18–20 in accordance with the present invention. The structures of FIGS. 21–25 and 30 apply equally to, and are descriptive of, both embodiments; the structures of FIGS. 26 and 27 apply to the embodiment through which the structure of FIG. 19 is realized; the structures of FIGS. 28 and 29 apply to the embodiment through which the structure of FIG. 20 is realized.

Figure 21:
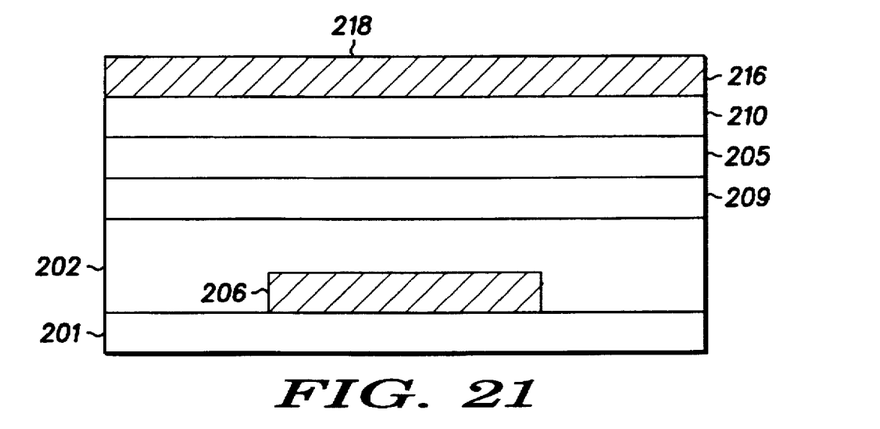
FIGS. 21–30 are cross-sectional views of structures realized by performing various steps of the embodiments of a process for manufacturing the field emission devices of FIGS. 18–20 in accordance with the present invention.

Referring now to FIG. 21 there is depicted the structure of FIG. 6 which has undergone the additional steps of forming ballast resist layer 209 on the outer surface of dielectric layer 202, forming emissive layer 205 on the outer surface of ballast resistor layer 209, forming emission control layer 210 on the outer surface of emissive layer 205, and thereafter forming a resist layer 216, having an outer surface 218, on the outer surface of emission control layer 210. Conductive row 206 is about 0.2 micrometers thick, and dielectric layer 202 is about 1 micrometer thick. Ballast resist layer 209 is about 0.2 micrometers thick and includes a layer of amorphous silicon which is implanted with about $5 \times 10^{15}$ cm$^{-2}$ of boron at 30 KeV. Ballast resist layer 209 functions as a ballast resistor in FED 200. Emissive layer 205 is about 500 angstroms thick and includes a layer of amorphous carbon. Emissive layer 205 is the source of electrons in emitter structure 208 and emits the electrons from an edge created during the formation of emitter well 207, as will be described in greater detail below. Emission control layer 210 is a layer of amorphous silicon about 0.2 micrometers thick. Emission control layer 210 and ballast resist layer 209 prevent spurious electron emission from otherwise open amorphous carbon areas and shape the extraction field at the emission edge so that a relatively collimated sheet of electrons can be extracted. In a field emission display, the collimated sheet of electrons is helpful in focusing on red, green, and blue phosphor stripes. Deposition and implantation methods are known by one skilled in the art, and include methods such as plasma enhanced chemical vapor deposition.

Figure 22:
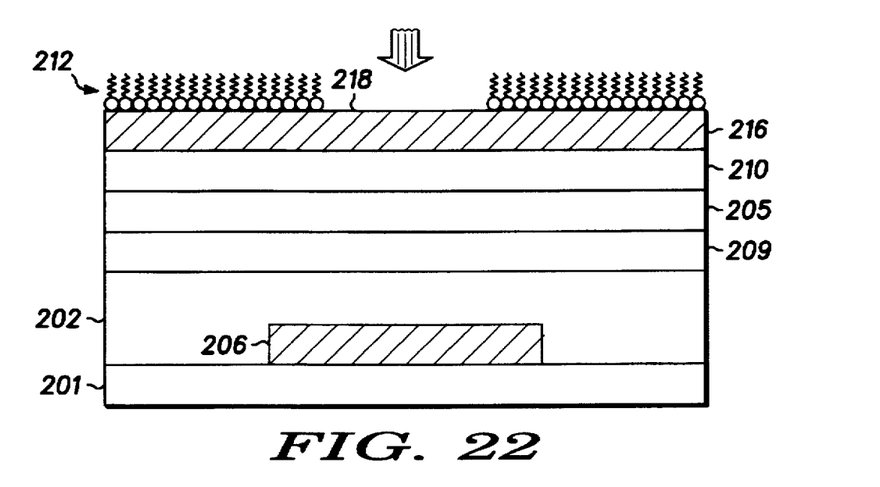

Referring now to FIG. 22 there is depicted the structure of FIG. 21 which has undergone the additional step of forming a self-assembled monolayer (SAM) 212 on outer surface 218. SAM 212 includes an emitter well pattern in a manner analogous to SAM 112 of FIG. 8. The selection of the SAM-forming molecular species of SAM 212 and of the material of resist layer 216 is guided by the same criteria described with reference to FIGS. 3 and 8. The arrow in FIG. 22 represents the action of an etchant of the subsequent steps described with reference to FIG. 23.

Figure 23:
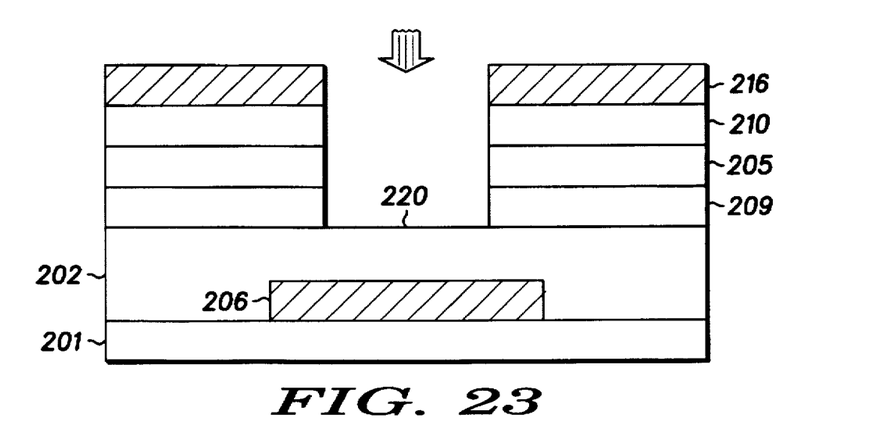

Referring now to FIG. 23 there is depicted the structure of FIG. 22 which has undergone the additional steps of selectively etching resist layer 216 so that the emitter well patter is transferred to resist layer 216, by using an etchant chemically inert with respect to SAM 212, thereafter selectively etching emission control layer 210, thereafter selectively etching emissive layer 205, and thereafter selectively etching ballast resistor layer 209. This etching sequence creates an emission edge in emissive layer 205. Electrons are emitted from the emission edge within emitter well 207 when the appropriate voltages are applied to FED 200, which is readily apparent to one skilled in the art. The arrow in FIG. 23 represents the action of the etchant in the next step.

Figure 24:
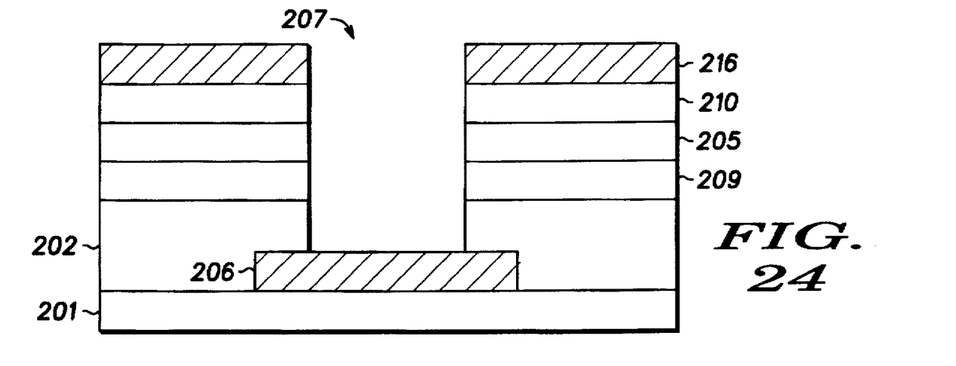

Referring now to FIG. 24 there is depicted the structure of FIG. 23 which has undergone the additional step of selectively etching dielectric layer 202 so that conductive row 206 is exposed and thereby completing the formation of emitter well 207, in accordance with one embodiment of the present invention. The subsequent step of forming conductive column 203, thereby completing the structure of FED 200, is performed as described with reference to FIGS. 11–17, utilizing a SAM such as the SAMs described with reference to FIGS. 27 and 29, which will be described in greater detail below. This particular embodiment of the present invention, wherein the step of forming conductive column 203 is performed subsequent the step of etching dielectric layer 202, requires that the material of resist layer 216 differ from that of conductive row 206 so that the steps of patterning or removing resist layer 216 do not attack conductive row 206. As an example, conductive row 206 can be made of aluminum, while resist layer is made of gold.

Figure 25:
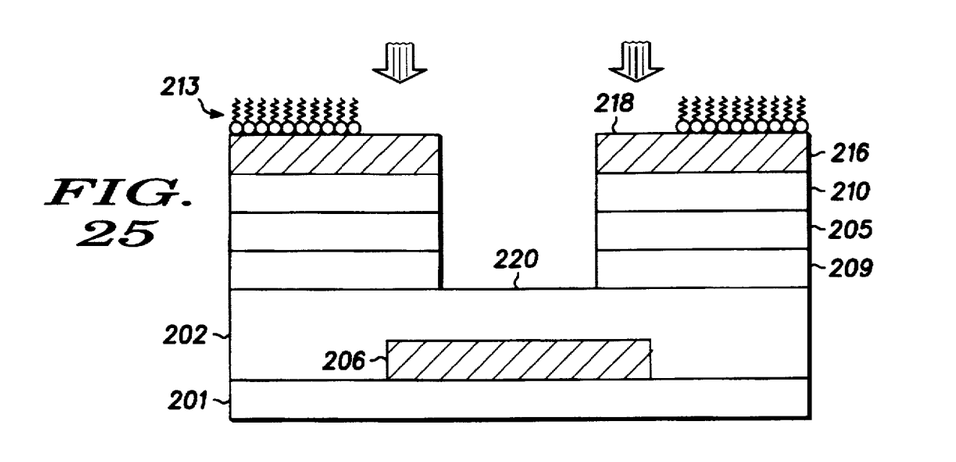

Referring now to FIG. 25 there is depicted a cross-sectional view of the structure of FIG. 23 which has undergone the additional step of forming a self-assembled monolayer (SAM) 213 on outer surface 218 of resist layer 216. SAM 213 defines a conductive column pattern which is subsequently etched into resist layer 216. This particular embodiment of the present invention, wherein the step of forming conductive column 203 occurs prior to the step of etching dielectric layer 202, permits the use of the same material for conductive row 206 and resist layer 216; it also permits the use of the same material for conductive row 206 and conductive column 203. As an example, conductive row 206 and resist layer 216 can both be made of aluminum. The arrows in FIG. 25 represent the etching action of the etchant during the subsequent step of selectively etching resist layer 216.

Figure 26:
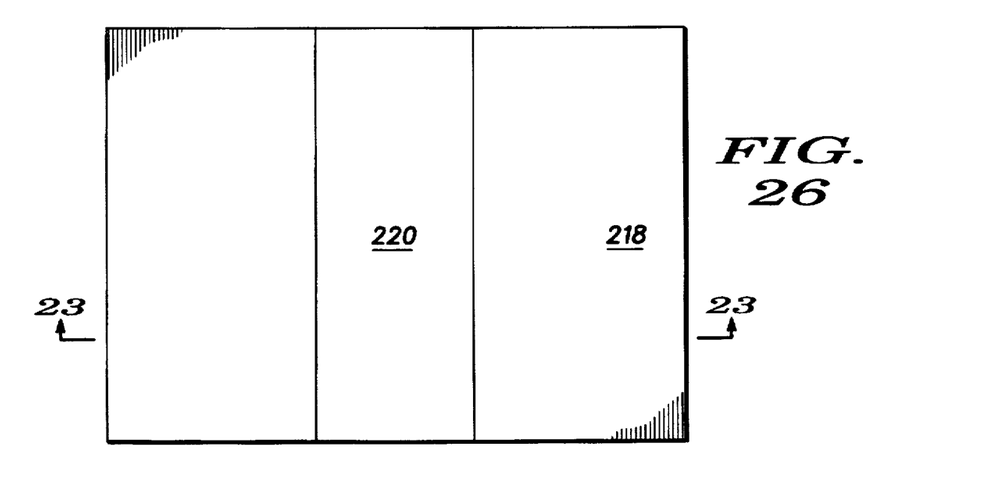
Figure 27:
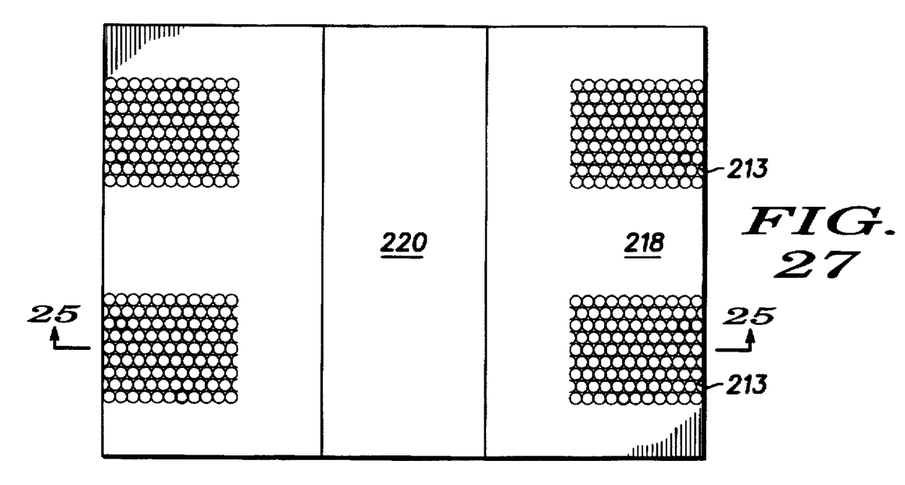

Referring now to FIGS. 26 and 27 there are depicted top plan views of the structures of FIGS. 23 and 25, respectively, which are realized in accordance with another embodiment of the present invention. The views of FIGS. 23 and 25 are the cross-sections of the structures in FIGS. 26 and 27, respectively, taken along the lines 23—23 and 25—25, respectively. The structures in FIGS. 26 and 27 are realized in the formation of FED 300 (FIG. 19). The conductive column pattern of SAM 213 in this particular embodiment defines elongated strips forming an edge positioned a distance from the edges of emitter structure 208 which lie in emitter well 207. The function of creating this edge will be described with reference to FIG. 30 below.

Figure 28:
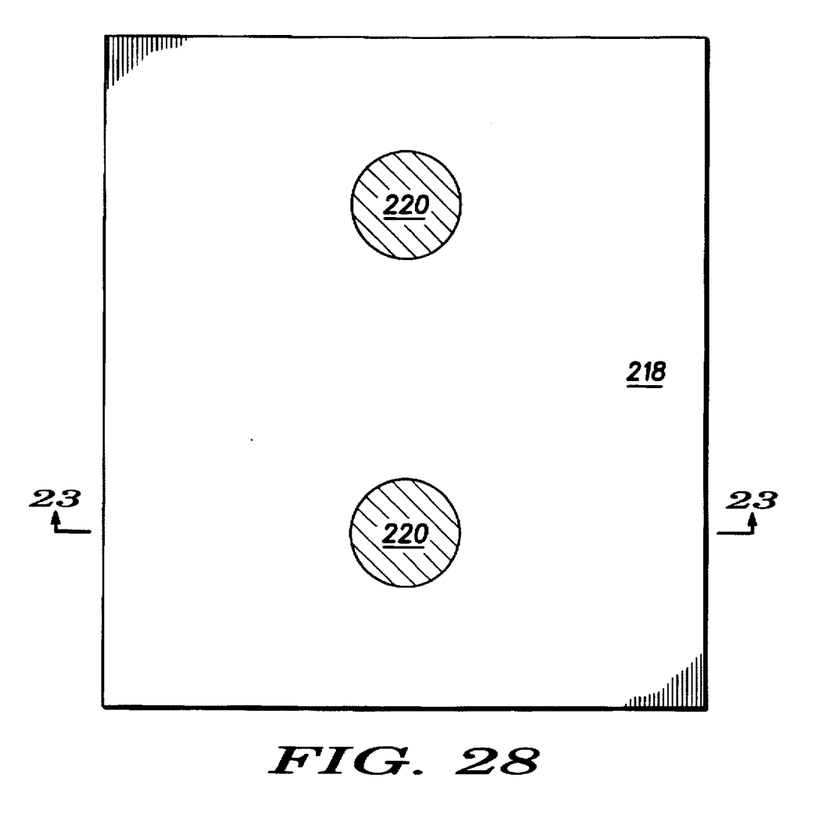
Figure 29:
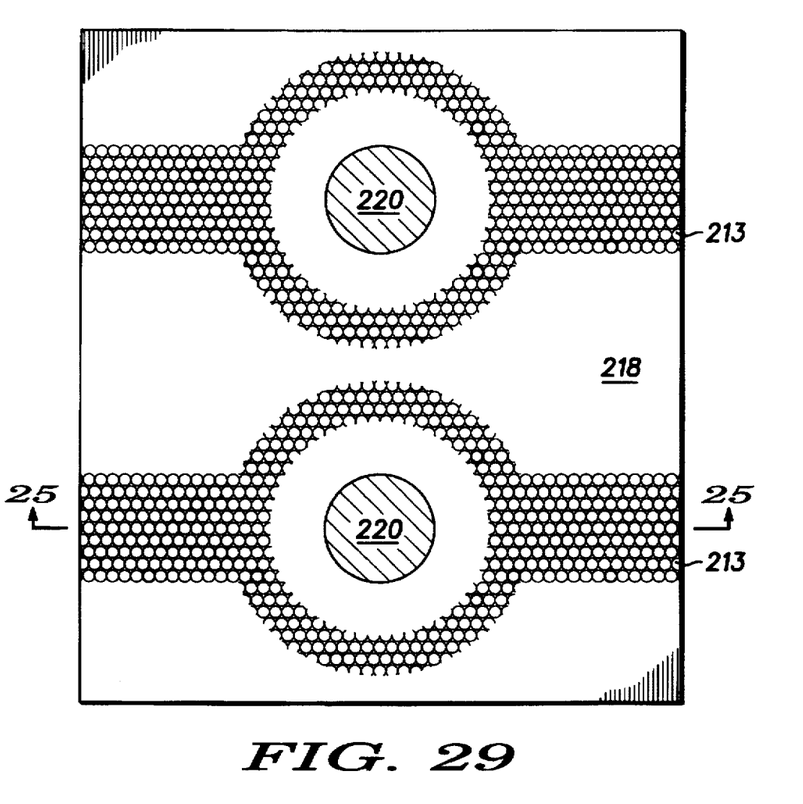

Referring now to FIGS. 28 and 29 there are depicted top plan view of FIGS. 23 and 25, in a manner analogous to FIGS. 26 and 27, and depict structures realized during another embodiment in accordance with the present invention in the formation of FED 400 (FIG. 20).

Figure 30:
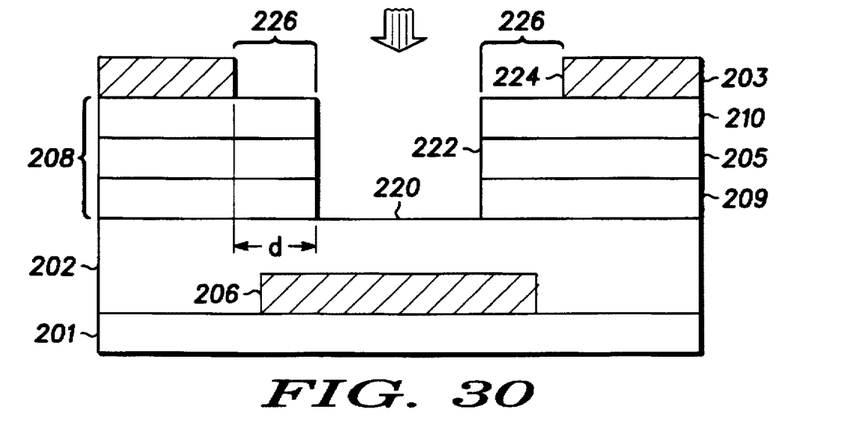

Referring now to FIG. 30 there is depicted a cross-sectional view of the structures of FIGS. 27 and 29 which have undergone the additional step of selectively etching resist layer 216 with an etchant chemically inert with respect to SAM 213. In this particular embodiment conductive row 203 is formed so that conductive column 203 includes an edge 224 positioned a distance, d, from an edge 222 of emitter structure 208 which is positioned in emitter well 207. The lateral region of emitter structure 208 between edge 222 of emitter structure 208 and edge 224 of conductive column 203, as depicted in FIG. 30, forms a ballast resistor 226 which offers better control of electron emission during the operation of FED 200. In another embodiment of the present invention the step of forming conductive column 203 is analogous to the formation of conductive column 103 as shown in FIGS. 11–14, wherein resist layer 216 is removed, and a new conductive layer is formed on emission control layer 210 and subsequently patterned. The arrow in FIG. 30 represents the action of an etchant in the subsequent step of selectively etching dielectric layer 202, thereby completing the formation of emitter well 207 and FED 200, as depicted in FIG. 18.

Referring again to FIGS. 19–20 the structures depicted therein illustrate the formation of an array of field emission devices realized by a method in accordance with the present invention, wherein a plurality of conductive columns 103, 203 and/or a plurality of conductive rows 106, 206 are formed utilizing SAM-patterning steps as described above. The plurality of conductive rows 106, 206 and the plurality of conductive columns 103, 203 comprise a matrix addressable scheme for addressing individual emitter wells 107, 207, such as is utilized in a field emission display.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

We claim:

1. A process for manufacturing a field emission device comprising the steps of:

providing a substrate having a surface;

forming a conductive row on the surface of the substrate;

forming a dielectric layer on the surface of the substrate and on the conductive row, the dielectric layer having an outer surface;

forming a resist layer overlaying the outer surface of the dielectric layer, the resist layer having an outer surface;

forming a self-assembled monolayer of a self-assembled monolayer-forming molecular species on the outer surface of the resist layer, the self-assembled monolayer defining an emitter well pattern;

etching the resist layer with an etchant chemically inert with respect to the self-assembled monolayer so that the emitter well pattern is transferred to the resist layer;

etching the dielectric layer with an etchant that is chemically inert with respect to the conductive row thereby forming an emitter well;

forming an electron-emitter structure within the emitter well; and forming a conductive column overlaying the dielectric layer.

2. A process for manufacturing a field emission device as claimed in claim 1, wherein the step of forming an electron-emitter structure includes the steps of:

subsequent to the step of forming the dielectric layer and prior to the step of forming the resist layer, forming a ballast resistor layer on the outer surface of the dielectric layer, the ballast resistor layer having an outer surface;

thereafter forming an emissive layer on the outer surface of the ballast resistor layer, the emissive layer having an outer surface;

thereafter forming an emission control layer on the outer surface of the emissive layer, the emission control layer having an outer surface;

thereafter forming the resist layer on the outer surface of the emission control layer;

subsequent the step of etching the resist layer and prior to the step of etching the dielectric layer, selectively etching the emission control layer thereby transferring the emitter well pattern to the emission control layer;

thereafter selectively etching the emissive layer; and thereafter selectively etching the ballast resistor layer.

3. A process for manufacturing a field emission device a claimed in claim 2, wherein the step of forming a conductive column includes, subsequent the step of selectively etching the ballast resistor layer and prior to the step of etching the dielectric layer, the steps of:

forming a self-assembled monolayer of a self-assembled monolayer-forming molecular species on the outer surface of the resist layer, the self-assembled monolayer defining a conductive column pattern to be etched into the resist layer; and selectively etching the resist layer with an etchant chemically inert with respect to the self-assembled monolayer so that the conductive column pattern is transferred to the resist layer thereby forming the conductive column.

4. A process for manufacturing a field emission device as claimed in claim 3, wherein the steps of forming a conductive row and forming a conductive column include utilizing the same conductive material.

5. A process for manufacturing a field emission device as claimed in claim 3, wherein the steps of forming a conductive row and forming a conductive column include forming the conductive row and the conductive column from aluminum.

6. A process for manufacturing a field emission device as claimed in claim 1, wherein the step of forming a conductive row on the surface of the substrate includes the steps of:

forming a conductive layer on the surface of the substrate, the conductive layer having an outer surface;

forming a self-assembled monolayer of a self-assembled monolayer-forming molecular species on the outer surface of the conductive layer so that the self-assembled monolayer defines a conductive row pattern; and etching the conductive layer with an etchant chemically inert with respect to the self-assembled monolayer so that the conductive row pattern is transferred to the conductive layer thereby forming the conductive row.

7. A process for manufacturing a field emission device as claimed in claim 6 further including the subsequent step of removing the self-assembled monolayer.

8. A process for manufacturing a field emission device as claimed in claim 1 wherein the step of forming a conductive row on the surface of the substrate includes the steps of:

forming a conductive layer on the surface of the substrate, the conductive layer having an outer surface;

forming a resist layer on the outer surface of the conductive layer, the resist layer having an outer surface;

forming a self-assembled monolayer of a self-assembled monolayer-forming molecular species on the outer surface of the resist layer so that the self-assembled monolayer defines an conductive row pattern to be etched into the resist layer and the conductive layer;

etching the resist layer with an etchant chemically inert with respect to the self-assembled monolayer so that the conductive row pattern is transferred to the resist layer; and thereafter selectively etching the conductive layer so that the conductive row pattern is transferred to the conductive layer thereby forming the conductive row.

9. A process for manufacturing a field emission device as claimed in claim 8 further including the subsequent step of removing the resist layer.

10. A process for manufacturing a field emission device as claimed in claim 1 wherein the step of forming a conductive column includes the steps of, subsequent the step of etching the resist layer:

removing the self-assembled monolayer from the outer surface of the resist layer;

thereafter forming a self-assembled monolayer on the outer surface of the resist layer, the self-assembled monolayer defining a conductive column pattern; and thereafter selectively etching the resist layer with an etchant chemically inert with respect to the self-assembled monolayer so that the conductive column pattern is transferred to the resist layer thereby forming the conductive column.

11. A process for manufacturing a field emission device as claimed in claim 10 wherein the step of forming a second self-assembled monolayer occurs subsequent the step of etching the dielectric layer.

12. A process for manufacturing a field emission device as claimed in claim 1 wherein the step of forming a conductive column includes the steps of:

forming a conductive layer overlaying the outer surface of the dielectric layer, the conductive layer including a material different from the material of the conductive row and having an outer surface;

forming a self-assembled monolayer of a self-assembled monolayer-forming molecular species on the outer surface of the conductive layer so that the self-assembled monolayer defines a conductive column pattern; and thereafter selectively etching the conductive layer with an etchant chemically inert with respect to the self-assembled monolayer so that the conductive column pattern is transferred to the conductive layer thereby forming the conductive column.

13. A process for manufacturing a field emission device as claimed in claim 12 further including, prior to the step of forming a conductive layer, the step of removing the resist layer and wherein the conductive layer is formed on the outer surface of the dielectric layer.

14. A process for manufacturing a field emission device as claimed in claim 13 wherein the step of removing the resist layer occurs subsequent the step of etching the dielectric layer.

15. A process for manufacturing a field emission device as claimed in claim 1 wherein the step of forming a conductive column includes the steps of, subsequent the step of etching the resist layer:

forming a conductive layer overlaying the dielectric layer, the conductive layer having an outer surface;

forming a second resist layer on the outer surface of the conductive layer, the second resist layer having an outer surface;

forming a second self-assembled monolayer of a self-assembled monolayer-forming molecular species on the outer surface of the second resist layer so that the second self-assembled monolayer defines an conductive column pattern;

selectively etching the second resist layer with an etchant chemically inert with respect to the second self-assembled monolayer so that the conductive column pattern is transferred to the second resist layer; and thereafter selectively etching the conductive layer so that the conductive column pattern is transferred to the conductive layer thereby forming the conductive column.

16. A process for manufacturing a field emission device as claimed in claim 15 further including, prior to the step of forming a conductive layer, the step of removing the resist layer and wherein the conductive layer is formed on the outer surface of the dielectric layer.

17. A process for manufacturing a field emission device as claimed in claim 15 further including the subsequent step of removing the second resist layer.

18. A process for manufacturing an array of field emission devices comprising the steps of:

providing a substrate having a surface;

forming a plurality of conductive rows on the surface of the substrate;

forming a dielectric layer on the surface of the substrate and on the plurality of conductive rows, the dielectric layer having an outer surface;

forming a resist layer overlying the outer surface of the dielectric layer, the resist having an outer surface;

forming a self-assembled monolayer of a self-assembled monolayer-forming molecular species on the outer surface of the resist layer, the self-assembled monolayer defining a pattern for a plurality of emitter wells;

etching the resist layer with an etchant chemically inert with respect to the self-assembled monolayer so that the pattern for a plurality of emitter wells is transferred to the resist layer;

etching the dielectric layer with an etchant that is chemically inert with respect to the plurality of conductive rows thereby forming a plurality of emitter wells;

forming a plurality of electron-emitter structures one each within the plurality of emitter wells; and forming a plurality of conductive columns overlying the dielectric layer so that the plurality of conductive columns overlie the plurality of conductive rows at the locations of the plurality of emitter wells whereby the plurality of conductive rows and the plurality of conductive columns comprise a matrix addressable scheme for individually addressing the plurality of emitter wells.

19. A process for manufacturing a field emission display having a field emission region having a predetermined area, the process comprising the steps of:

providing a substrate having a surface;

forming a plurality of conductive rows on the surface of the substrate;

forming a dielectric layer on the surface of the substrate and the plurality of conductive rows, the dielectric layer having an outer surface;

forming a resist layer so that it overlays the outer surface of the dielectric layer, the resist layer having an outer surface having an area substantially equal to the predetermined area of the field emission region;

forming a self-assembled monolayer of a self-assembled monolayer-forming molecular species on the outer surface of the resist layer, the self-assembled monolayer defining a pattern for a plurality of emitter wells;

etching the resist layer with an etchant chemically inert with respect to the self-assembled monolayer so that the pattern for a plurality of emitter wells is transferred to the resist layer;

etching the dielectric layer with an etchant that is chemically inert with respect to the resist layer and the plurality of conductive rows thereby forming a plurality of emitter wells defining the field emission region of the field emission display;

forming a plurality of electron-emitter structures one each within the plurality of emitter wells;

forming a plurality of conductive columns overlying the dielectric layer so that the plurality of conductive columns overlie the plurality of conductive rows at the locations of the plurality of emitter wells whereby the plurality of conductive rows and the plurality of conductive columns comprise a matrix addressable scheme for individually addressing the plurality of emitter wells; and providing a face plate having a cathodoluminescent layer designed to receive electrons emitted by the plurality of electron-emitter structures and to emit visible light thereby forming a visual display image.

* * * * *